(12) United States Patent
Son

(10) Patent No.: US 8,557,453 B2
(45) Date of Patent: Oct. 15, 2013

(54) FUEL CELL SYSTEM HAVING WATER RECOVERING AND CIRCULATING STRUCTURE

(75) Inventor: In-hyuk Son, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1136 days.

(21) Appl. No.: 11/797,891

(22) Filed: May 8, 2007

(65) Prior Publication Data

US 2007/0269708 A1 Nov. 22, 2007

(30) Foreign Application Priority Data

May 17, 2006 (KR) .................. 10-2006-0044128

(51) Int. Cl.
*H01M 8/00* (2006.01)
(52) U.S. Cl.
USPC ........................................ 429/414; 429/450
(58) Field of Classification Search
USPC ............. 429/12, 13, 30, 34, 36, 38, 414, 450, 429/482, 494, 534
See application file for complete search history.

(56) References Cited

U.S. PATENT DOCUMENTS

| 6,660,423 B2 | 12/2003 | Neutzler et al. |
| 6,727,016 B2 | 4/2004 | Bostaph et al. |
| 2002/0146616 A1 | 10/2002 | Yasuo et al. |
| 2005/0238944 A1* | 10/2005 | Lee et al. ............ 429/38 |
| 2006/0046121 A1* | 3/2006 | Shimohira et al. .............. 429/30 |
| 2007/0248846 A1* | 10/2007 | Hohenthanner et al. ........ 429/12 |

FOREIGN PATENT DOCUMENTS

| JP | 2004152561 | 5/2004 |
| JP | 2005527063 | 9/2005 |
| KR | 10-2002-0019588 | 3/2002 |
| WO | WO0193356 | 12/2001 |

* cited by examiner

*Primary Examiner* — Mark F Huff
*Assistant Examiner* — Monique Wills
(74) *Attorney, Agent, or Firm* — Robert E. Bushnell, Esq.

(57) ABSTRACT

A fuel cell system having a water recovering and circulating structure, includes an electric generator provided with a membrane electrode assembly including an anode electrode into which a hydrogen containing fuel is introduced, a cathode electrode into which an oxidant is introduced, and an electrolyte polymer membrane interposed between the anode and cathode electrodes. The cathode electrode includes: a first catalyst layer which is in contact with the electrolyte polymer membrane and in which a reduction reaction for the oxidant occurs; and a first gas diffusion layer to diffuse the oxidant on the first catalyst layer. At least a part of the first gas diffusion layer directly contacts the electrolyte polymer membrane. Thus, water produced by the chemical reaction in the cathode electrode is introduced into the anode electrode through the electrolyte polymer membrane, and water is effectively prevented from evaporating, thereby enhancing the water recovering efficiency and thus enhancing the power generation efficiency of the fuel cell system.

17 Claims, 6 Drawing Sheets

FUEL CELL SYSTEM HAVING WATER RECOVERING AND CIRCULATING STRUCTURE

CLAIM OF PRIORITY

This application makes reference to, incorporates the same herein, and claims all benefits accruing under 35 U.S.C. §119 from an application for FUEL CELL SYSTEM HAVING WATER RECOVERING AND CYCLING STRUCTURE earlier filed in the Korean Intellectual Property Office on the 17$^{th}$ of May 2006 and there duly assigned Serial No. 10-2006-0044128.

BACKGROUND OF THE INVENTION

1. Field of the Invention

The present invention relates to a fuel cell system capable of recovering and recycling water produced in a cathode electrode, and more particularly, to a fuel cell system which transfers water produced in a catalyst layer of a cathode electrode to an electrolyte polymer membrane through a gas diffusion layer in order to recycle water.

2. Discussion of the Related Art

In general, a fuel cell system is a power generating system that generate electricity by electrochemical reaction between hydrogen contained in a hydrogen containing fuel and oxygen contained in an oxidant. Such a fuel cell system includes an electric generator to generate electricity through the electrochemical reaction between the hydrogen and oxygen, a fuel feeder to supply the hydrogen containing fuel to the electric generator, and an oxidant feeder to supply the oxidant to the electric generator.

The electric generator includes a unit cell having a membrane electrode assembly. The membrane electrode assembly includes an electrolyte membrane having selective ion permeability, and anode and cathode electrodes provided on opposite sides of the electrolyte membrane. In the anode electrode, carbon dioxide, hydrogen ions and electrons are produced by a reaction between the hydrogen containing fuel (e.g., methanol) and water, and the hydrogen ion is transferred to the cathode electrode through the electrolyte membrane. In the cathode electrode, the hydrogen ions, the electrons transferred through an external circuit, and oxygen are reacted to produce water.

When water produced in the cathode electrode is not smoothly discharged, oxygen from the outside is not introduced, so that the power generation efficiency of the fuel cell system deteriorates. Technology has been proposed to recycle water produced in the cathode electrode.

Japanese Patent First Publication No. 2004-152561 relates to a direct methanol fuel cell that includes a water recovering unit to recover some of the water produced from an air electrode and discharge the remainder of the water to the outside; and a mixer to mix water recovered by the water recovering unit with an aqueous methanol solution supplied from a fuel storage tank.

In Japanese Patent First Publication No. 2005-527063, as shown in FIG. 5 of the accompanying drawings, a fuel cell system has at least one thin membrane electrode assembly 16 in communication with a water recovering/recycling system 64 through a water recovering/recycling channel 53.

However, a structure for effectively recovering water from the air electrode is not included in the above-described patent applications.

In Korean Patent First Publication No. 2002-0019588, as shown in FIG. 6 of the accompanying drawings, a fuel cell has a gas diffusion layer 24 adjacent to a cathode 22 and including a first layer 241 contacting the cathode 22; and a second layer 242 thicker than the first layer 241 and having a surface along which oxidant gas flows, thereby maintaining the wettability and the gas diffusibility of a solid polymer membrane within a cell. However, because such first and second layers are provided separately, a production cost of the gas diffusion layer increases.

In U.S. Pat. No. 6,660,423, as shown in FIG. 7 of the accompanying drawings, a fuel cell system includes a membrane electrode assembly 16 having a hydrophilic thread 30 to absorb water produced in a cathode electrode 22, and a water recovering/circulating channel 58 communicating fluid to the hydrophilic thread 30. However, because such channel is separately provided for recovering water from the cathode electrode, cost and time for producing the fuel cell system are increased.

SUMMARY OF THE INVENTION

Accordingly, it is an object of the present invention to provide a fuel cell system having a water recovering/recycling structure capable of effectively recovering and recycling water from a cathode electrode to an anode electrode without a separate channel.

Another object of the present invention is to provide a fuel cell system having a water recovering/recycling structure capable of circulating water produced in a cathode electrode to an anode electrode while preventing water from evaporating in the air in order to enhance the efficiency of water recovery.

The foregoing and/or other objects of the present invention are achieved by providing a fuel cell system a water recovering and circulating structure, the system including: an electric generator provided with a membrane electrode assembly including an anode electrode into which a hydrogen containing fuel is introduced, a cathode electrode into which an oxidant is introduced, and an electrolyte polymer membrane interposed between the anode and cathode electrodes; the cathode electrode includes: a first catalyst layer arranged in contact with the electrolyte polymer membrane and adapted to effect a reduction reaction for the oxidant; and a first gas diffusion layer adapted to diffuse the oxidant on the first catalyst layer, at least a part of the first gas diffusion layer directly contacting the electrolyte polymer membrane.

The first gas diffusion layer preferably has a larger area than the first catalyst layer.

The anode electrode preferably includes a second catalyst layer arranged in contact with the electrolyte polymer membrane and adapted to effect an oxidation reaction for the hydrogen containing fuel, and a second gas diffusion layer adapted to diffuse the hydrogen containing fuel on the second catalyst layer.

The second catalyst layer preferably has the same area as the second gas diffusion layer.

The first gas diffusion layer preferably has a larger area than the second gas diffusion layer.

The electric generator preferably includes gaskets respectively arranged with the anode and cathode electrodes. The gaskets are preferably arranged with respective openings exposing surfaces of the first and second gas diffusion layers. The opening of a first gasket provided with the cathode electrode is preferably larger than the opening of a second gasket provided with the anode electrode.

The electric generator preferably includes a water-evaporation preventing member arranged to cover an external surface of the first gas diffusion layer by the cathode electrode.

The water-evaporation preventing member preferably includes a hydrophobic membrane. The hydrophobic membrane preferably includes a fluoric resin. The fluoric resin preferably includes at least one resin selected from among polytetrafluoro ethylene (PTFE), perfluorocarbon sulfonic acid, tetrafluoroethylene-perfluoroalkylvinyl ether copolymer (PFA), polytetrafluoroethylene-hexafluoropropylene copolymer (FEP), polychlorotrifluoroethylene (PCTFE), polyfluorovinyledene (PVDF), polyfluorovinyl (PVF), tetrafluoroethylene-ethylene copolymer (FTFE).

The first gas diffusion layer of the cathode electrode is preferably directly exposed to air.

The fuel cell system preferably further includes a housing having an accommodating space adapted to accommodate the electric generator, the housing including a storage space adapted to store the hydrogen containing fuel to be supplied to the anode electrode, and a top plate having vents to directly expose the cathode electrode to air.

The fuel cell system preferably further includes a water-evaporation preventing member arranged between the top plate of the housing and the first gas diffusion layer of the cathode electrode. The water-evaporation preventing member preferably includes a hydrophobic membrane. The hydrophobic membrane preferably includes a fluoric resin. The fluoric resin preferably includes at least one resin selected from among polytetrafluoro ethylene (PTFE), 8 perfluorocarbon sulfonic acid, tetrafluoroethylene-perfluoroalkylvinyl ether copolymer (PFA), polytetrafluoroethylene-hexafluoropropylene copolymer (FEP), polychlorotrifluoroethylene (PCTFE), polyfluorovinyledene (PVDF), polyfluorovinyl- (PVF), tetrafluoroethylene-ethylene copolymer (FTFE).

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention are described with reference to the accompanying drawings.

Figure 1:
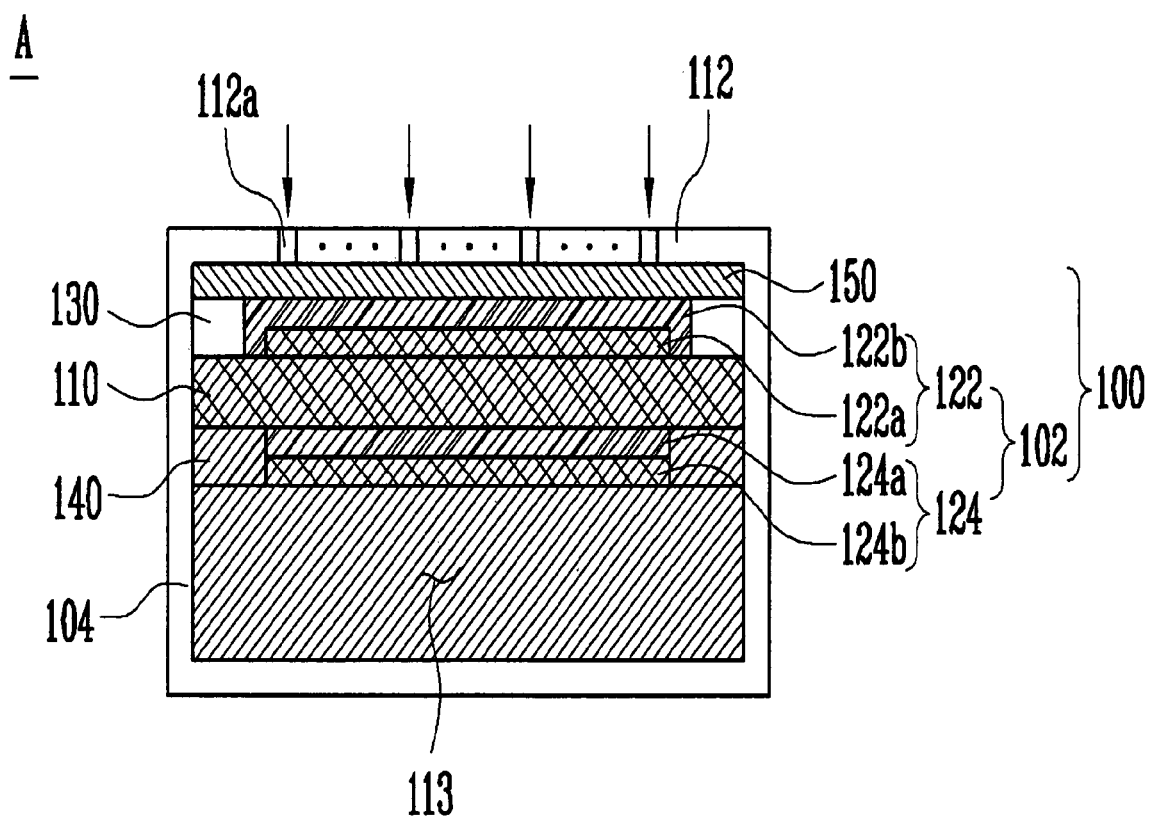
FIG. 1 is a schematic sectional view of a passive type fuel cell system having a water recovering/circulating structure according to an embodiment of the present invention.
Figure 2:
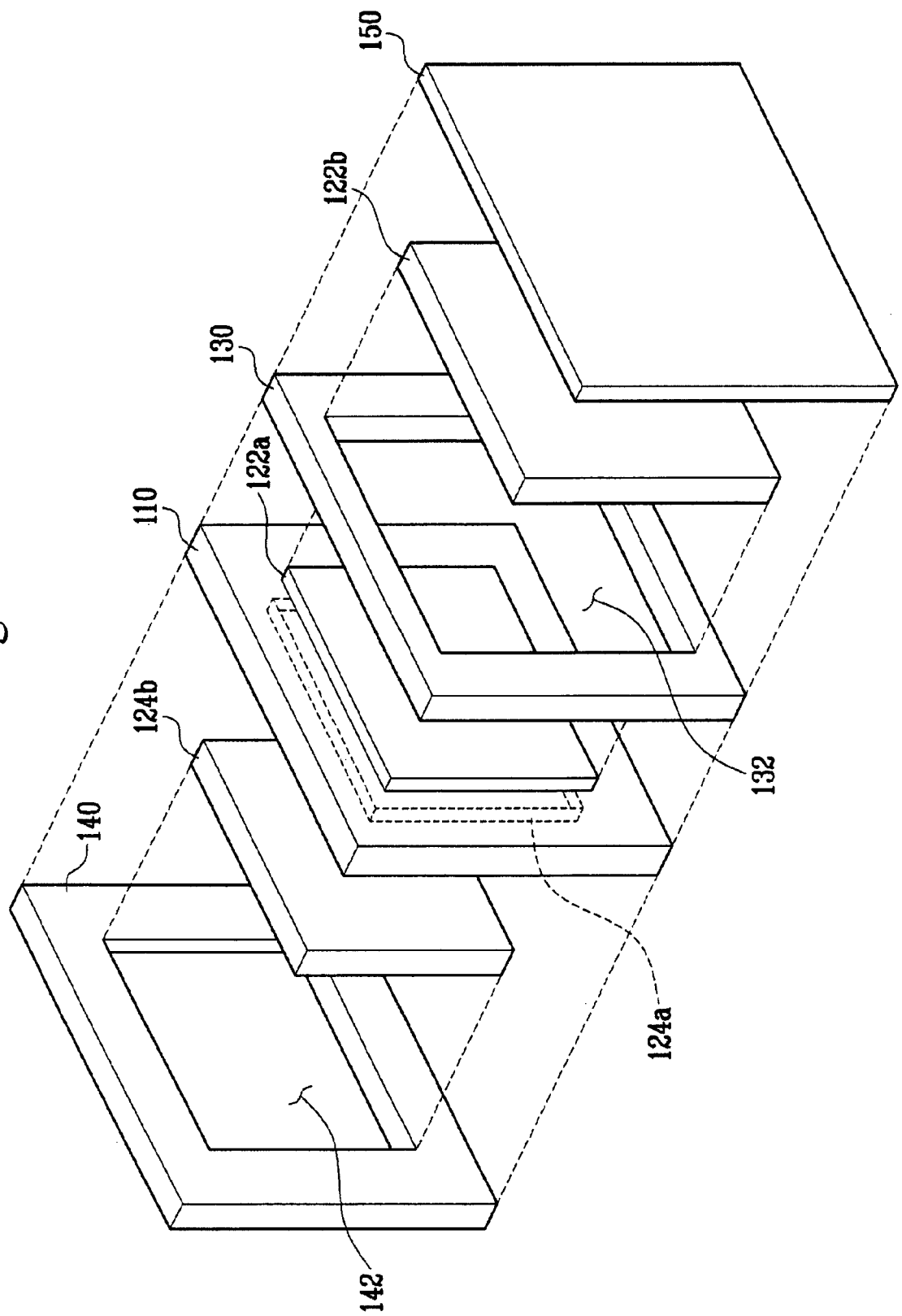
FIG. 2 is an exploded perspective view of an electric generator according to an embodiment of the present invention.
Figure 3:
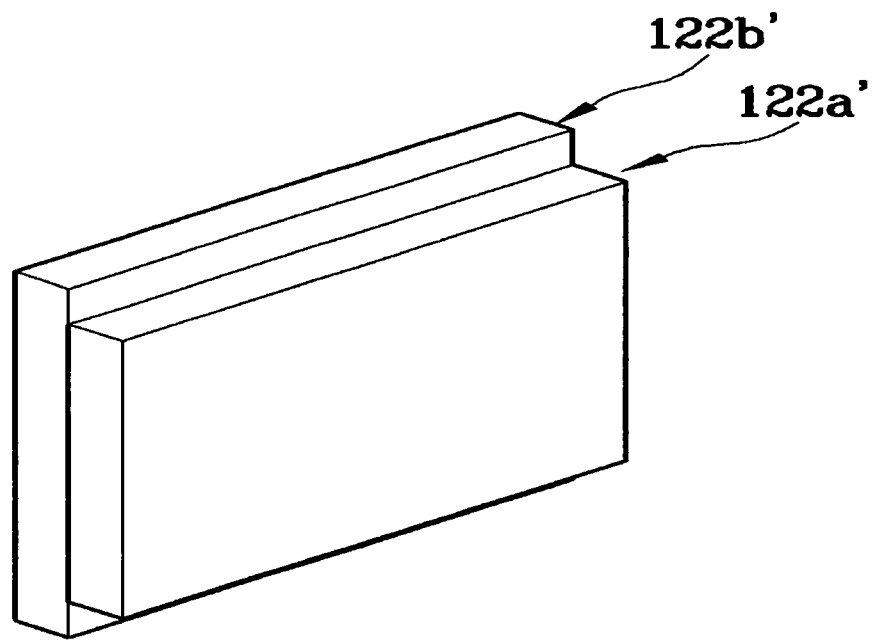
FIG. 3 is a perspective view of a size comparison between a gas diffusion layer and a catalyst layer in a cathode electrode according to an embodiment of the present invention.
Figure 4:
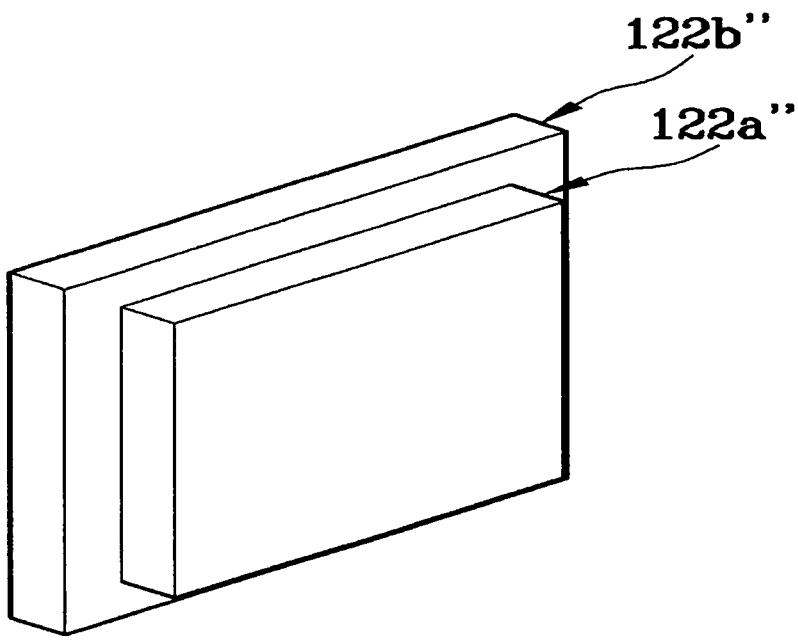
FIG. 4 is a perspective view of a size comparison between a gas diffusion layer and a catalyst layer in a cathode electrode according to another embodiment of the present invention.
Figure 5:
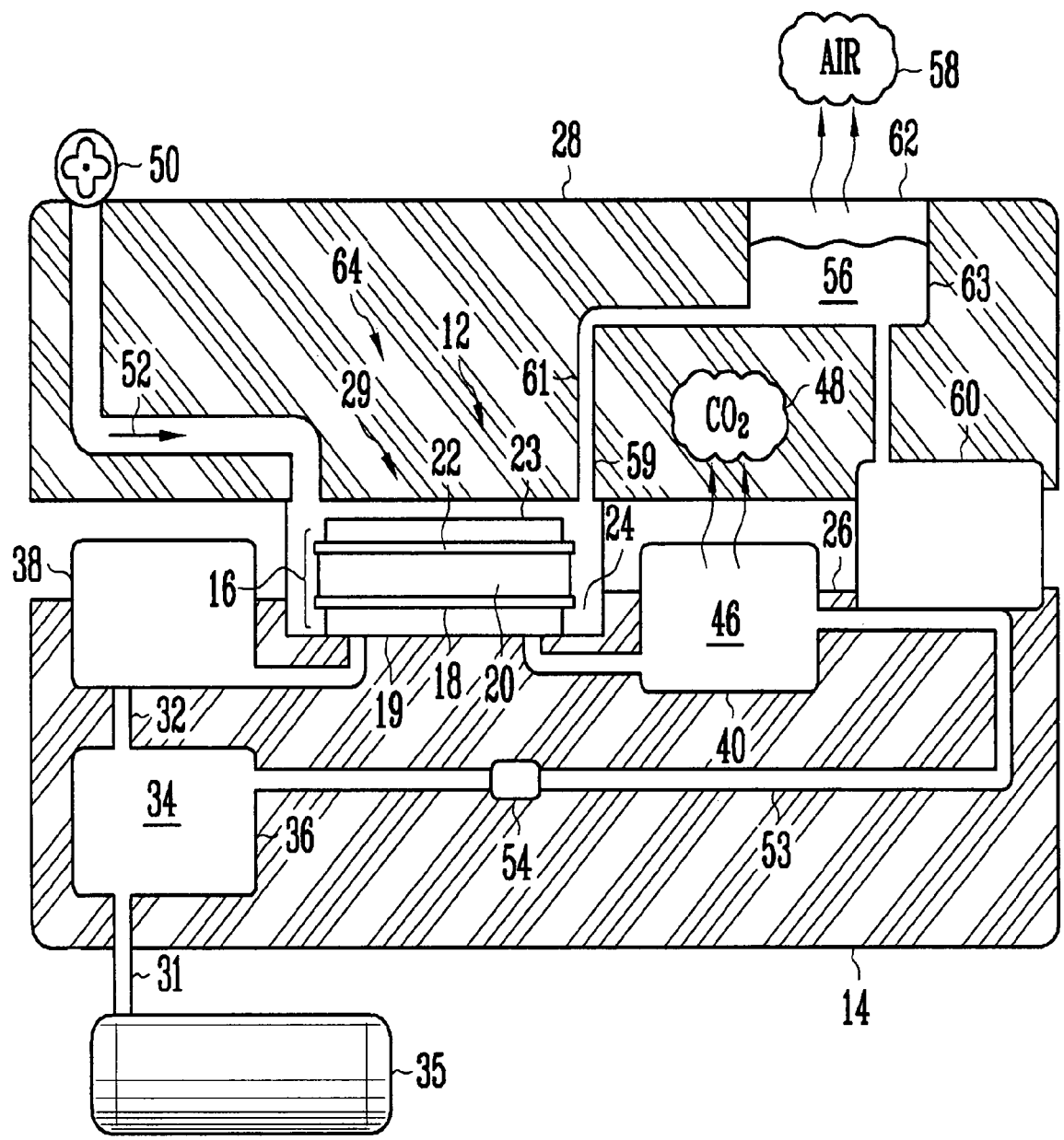
FIG. 5 is a schematic view of a water recovery system of a conventional direct methanol fuel cell.
Figure 6:
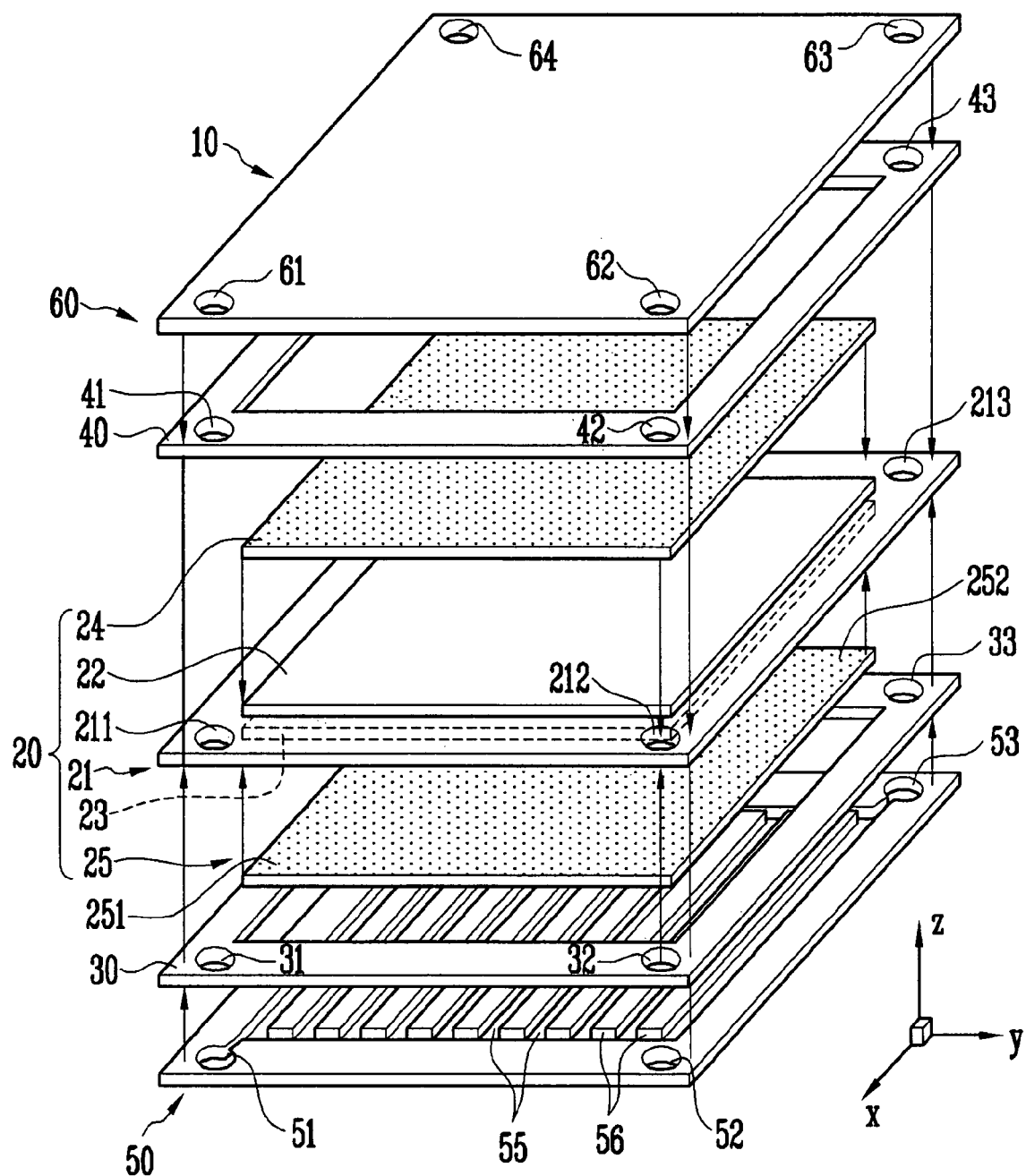
FIG. 6 is a schematic perspective view of another conventional direct methanol fuel cell.
Figure 7:
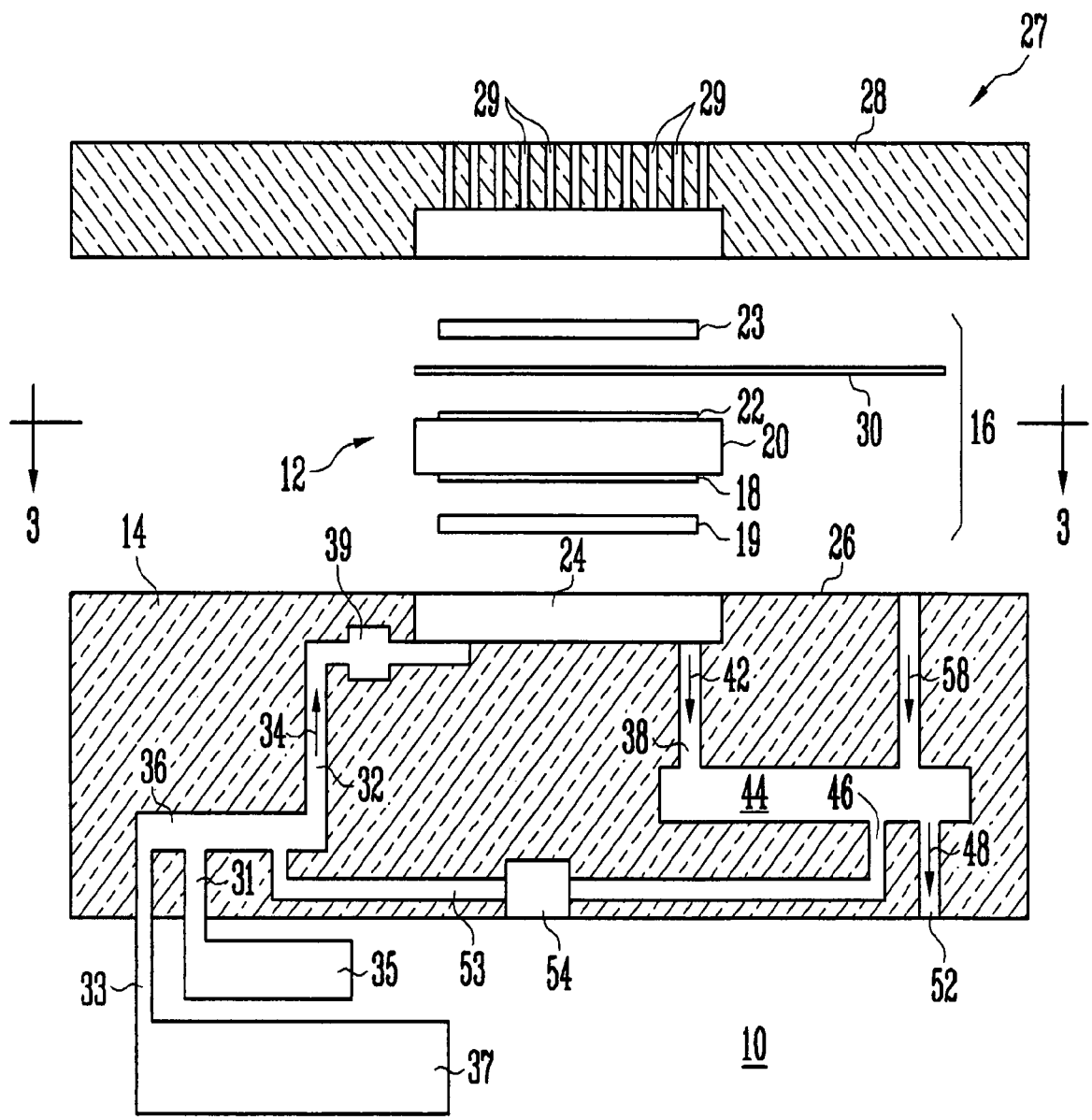
FIG. 7 is a schematic view of still another conventional fuel cell having a water management system.

FIG. 1 is a schematic sectional view of a passive type fuel cell system having a water recovering/circulating structure according to an embodiment of the present invention; FIG. 2 is an exploded perspective view of an electric generator according to an embodiment of the present invention; FIG. 3 is a perspective view of a size comparison between a gas diffusion layer and a catalyst layer in a cathode electrode according to an embodiment of the present invention; and FIG. 4 is a perspective view of a size comparison between a gas diffusion layer and a catalyst layer in a cathode electrode according to another embodiment of the present invention.

A fuel cell system is classified into a Phosphoric Acid Fuel Cell (PAFC), a Molten Carbonate Fuel Cell (MCFC), a Solid Oxide Fuel Cell (SOFC), a Polymer Electrolyte Membrane Fuel Cell (PEMFC), an Alkaline Fuel Cell (AFC), etc. according to the kinds of electrolyte. Among such fuel cell systems, the PEMFC is relatively excellent in output characteristics, operates at a low temperature, quickly starts and has short response time, so that it has been widely developed and researched for use as a portable power generator. However, the PEMFC is in need of a reformer to obtain hydrogen from the hydrogen containing fuel, which puts limitation on miniaturizing the fuel cell system. To overcome this limitation, a Direct Methanol Fuel Cell (DMFC) has been developed to directly use methanol as the hydrogen containing fuel.

The DMFC can be classified into an active type and a passive type according to arrangements of unit cells, e.g., according to a stacked state of unit cells and a planar arrangement of unit cells. In addition, there is a semi-passive type fuel cell system that can be achieved by adding a blower to the passive type fuel cell in order to increase a supplied amount of an oxidant.

Hereinafter, an embodiment of the present invention is applied to the passive type fuel cell system, but not limited thereto.

Referring to FIG. 1, a fuel cell system according to an embodiment of the present invention includes an electric generator 100 to generate electricity based on an electrochemical reaction between hydrogen and oxygen. The electric generator 100 includes a plurality of unit cells. Each unit cell includes a Membrane Electrode Assembly (MEA) 102 that has an electrolyte polymer membrane 110, and anode and cathode electrodes 124 and 122 provided on opposite sides of the electrolyte polymer membrane 110.

Furthermore, the fuel cell system includes a housing 104 having an accommodating space to accommodate the electric generator 100. The housing 104 has a predetermined shape, e.g., a rectangular shape, At least one side plate, e.g., a top plate 112 of the housing 104 is formed with a plurality of vents 112a. An oxidant, (e.g., air) is introduced into the housing 104 through the vents 112a. The cathode electrode 122 of the electric generator 100 accommodated in the accommodating space of the housing 104 is adjacent to the top plate 112 and is directly exposed to air.

In the housing 104, a storage space 113 is formed under the anode electrode 124 of the electric generator 100 to store a hydrogen containing fuel. The storage space 113 of the housing 104 stores the hydrogen containing fuel supplied from a fuel feeder (not shown) or a hydrogen containing fuel that has been diluted with water to be in a low concentration.

In this embodiment, methanol mixed with water and oxygen are respectively employed by way of example as the hydrogen containing fuel and the oxidant.

In the Membrane Electrode Assembly (MEA) 102, the cathode electrode 122 includes a first catalyst layer 122a in which oxygen introduced through the vents 112a of the top plate 112 is chemically reacted with hydrogen ions introduced from the anode electrode 124 through the electrolyte polymer membrane 110; and a first Gas Diffusion Layer (GDL) 122b in which oxygen introduced through the vents 112a is uniformly diffused and water generated by the chemical reaction is discharged to the outside.

Likewise, the anode electrode 124 includes a second catalyst layer 124a in which the hydrogen containing fuel is changed by oxidation into hydrogen ions and electrons, and a second Gas Diffusion Layer (GDL) 124b in which the hydrogen containing fuel is uniformly diffused on the second catalyst layer 124a and carbon dioxide generated by the oxidation is discharged to the outside.

Furthermore, the electrolyte polymer membrane 110 serves as a hydrogen ion exchange membrane that transfers hydrogen ions produced in the second catalyst layer 124a of the anode electrode 124 to the first catalyst layer 122a of the cathode electrode 122, and at the same time serves to prevent the hydrogen containing fuel from crossover.

According to an embodiment of the present invention, a structure facilitating water produced in the cathode electrode 122 to be recovered and circulated toward the anode electrode 124 effects direct contact between at least a part of the first gas diffusion layer 122b and the electrolyte polymer membrane 110.

Preferably, the area of the first gas diffusion layer 122b is larger than that of the first catalyst layer 122a. For example, when each the first gas diffusion layer and the first catalyst layer has four edges, at least two edges or four edges of the first gas diffusion layer 122b' or 122b" are extended over two or four edges of the first catalyst layer 122a' or 122a", as shown in FIGS. 3 and 4. According to an embodiment of the present invention, the anode electrode 124 and the cathode electrode 122 are placed on opposite sides of the electrolyte polymer membrane 110 such as a fluoric cation exchange membrane (e.g., Nafion manufactured by DuPont) having a predetermined size, respectively, and they are processed by a hot-press, thereby manufacturing the membrane electrode assembly 102 with the water recovering/circulating structure. In the cathode electrode 122, the first gas diffusion layer 122b has a larger area than the first catalyst layer 122a such that at least a part of the first gas diffusion layer 122b directly contacts the electrolyte polymer membrane 110.

Referring back to FIG. 1, in the cathode electrode 122 of the membrane electrode assembly 102 manufactured by the hot-press process, the opposite ends of the first gas diffusion layer 122b directly contact the electrolyte polymer membrane 110 while surrounding the first catalyst layer 122a. On the other hand, in the anode electrode 124, the size of the second gas diffusion layer 124b is similar to that of the second catalyst layer 124a. Preferably, the size of the second catalyst layer 124a in the anode electrode 124 is approximately equal to that of the first catalyst layer 122a in the cathode electrode 122, but the size of the first gas diffusion layer 122b in the cathode electrode 122 is larger than that of the second gas diffusion layer 124b in the anode electrode 124.

In FIG. 1, reference numerals 130 and 140 indicate gaskets for preventing gas leakage in the anode electrode 124 and the cathode electrode 122 of the membrane electrode assembly 102.

Referring to FIG. 2, the first gasket 130 placed in the cathode electrode 122 is formed with a first opening 132 through which the first gas diffusion layer 122b is exposed. Furthermore, the second gasket 140 placed in the anode electrode 124 is formed with a second opening 142 through which the second gas diffusion layer 124b is exposed. As described above, because the first gas diffusion layer 122b of the cathode electrode 122 is larger than the second gas diffusion layer 124b of the anode electrode 124, the first opening 132 of the first gasket 130 is larger than the second opening 142 of the second gasket 140.

With this water recovering/circulating structure, water produced by a chemical reaction in the first catalyst layer 122a is recovered by the first gas diffusion layer 122b and circulated toward the second catalyst layer 124a of the anode electrode 124 via the electrolyte polymer membrane 110.

In result, even though the concentration of the hydrogen containing fuel supplied from the storage space 113 of the housing 104 to the anode electrode 124 is relatively high, the hydrogen containing fuel is mixed with water supplied from the cathode electrode 122 through the electrolyte polymer membrane 110, thereby lowering the concentration thereof. Furthermore, the electrolyte polymer membrane 110 is kept wet by water introduced from the first gas diffusion layer 122b, so that the hydrogen ions produced by the chemical reaction in the anode electrode 124 are smoothly transferred to the cathode electrode 122.

Because the cathode electrode 122 is exposed to the air, the water from the first gas diffusion layer 122b can evaporate and thus the efficiency of recovering water is likely to be lowered.

Therefore, according to an embodiment of the present invention, a water-evaporation preventing member 150 is provided to cover an external surface of the first gas diffusion layer 122b, thereby preventing water from evaporating. Preferably, the water-evaporation preventing member 150 is interposed between the first gas diffusion layer 122b of the cathode electrode 122 and the top plate 112 of the housing 104. Furthermore, the water-evaporation preventing member 150 preferably includes a hydrophobic membrane. More preferably, the water-evaporation preventing member 150 has a vapor-liquid separation characteristic, so that it not only prevents water of the cathode electrode 122 from evaporating but also smoothly introduces the oxidant from the outside.

Preferably, the membrane includes a fluoric resin having water repellency. For example, such a resin having the water repellency can be composed of at least one resin selected from a group consisting of polytetrafluoro ethylene (PTFE), perfluorocarbon sulfonic acid, tetrafluoroethylene-perfluoroalkylvinyl ether copolymer (PFA), polytetrafluoroethylene-hexafluoropropylene copolymer (FEP), polychlorotrifluoroethylene (PCTFE), polyfluorovinyledene (PVDF), polyfluorovinyl (PVF), tetrafluoroethylene-ethylene copolymer (FTFE), etc.

The operation of a fuel cell system having a water recovering/circulating structure according to an embodiment of the present invention is as follows.

When the electric generator 100 is mounted in the accommodating space of the housing 104, the hydrogen containing fuel (e.g., methanol of a predetermined concentration) stored in the storage space 113 of the housing 104 is introduced into the anode electrode 124 of the electric generator 100, and the oxidant from the air (e.g., oxygen) is introduced into the cathode electrode 122 of the electric generator 100 by passing through the water-evaporation preventing member 150 via the vents 112a of the housing 104.

In the anode electrode 124, methanol is uniformly diffused on the second catalyst layer 124a through the second gas diffusion layer 124b. Furthermore, in the cathode electrode 122, oxygen is uniformly diffused on the first catalyst layer 122a through the first gas diffusion layer 122b.

Then, in the electric generator 100, the following chemical reactions occur in the second catalyst layer 124a of the anode electrode 124 and the first catalyst layer 122a of the cathode electrode 122.

Anode: $CH_3OH + H_2O \rightarrow CO_2 + 6H^+ + 6e^-$

Cathode: $(3/2)O_2 + 6H^+ + 6e^- \rightarrow 3H_2O$

Total: $CH_3OH + (3/2)O_2 \rightarrow 2H_2O + CO_2$

In the second catalyst layer 124a of the anode electrode 124, carbon dioxide, six hydrogen ions and six electrons are produced by the reaction between methanol and water (oxidation).

The hydrogen ions are introduced into the first catalyst layer 122a of the cathode electrode 122 through the electrolyte polymer membrane 110. In the first catalyst layer 122a of the cathode electrode 122, the hydrogen ions from the anode electrode 124, the electrons from an external circuit, and oxygen are reacted, thereby producing water (reduction). Thus, methanol and oxygen are reacted, so that water and carbon dioxide are produced while generating electricity. The electricity is supplied to the outside through a collector (not shown).

Furthermore, water that results from the chemical reaction in the first catalyst layer 122a of the cathode electrode 122 is recovered to the first gas diffusion layer 122b, and then introduced into the second catalyst layer 124a of the anode electrode 124 through the electrolyte polymer membrane 110. The water-evaporation preventing member 150 prevents water recovered into the first gas diffusion layer 122b from evaporating, thereby enhancing the water recovering efficiency.

According to an embodiment of the present invention, water produced by the chemical reaction in the cathode electrode is introduced into the anode electrode through the electrolyte polymer membrane, and water is effectively prevented from evaporating, thereby enhancing the water recovering efficiency and thus enhancing power generation efficiency of the fuel cell system.

Although exemplary embodiments of the present invention have been shown and described, it would be appreciated by those skilled in the art that modifications can be made to these embodiments without departing from the principles and spirit of the present invention, the scope of which is defined by the following claims.

What is claimed is:

1. A fuel cell system having a water recovering and circulating structure, the system comprising:
an electric generator comprising:
a membrane electrode assembly including an anode electrode into which a hydrogen containing fuel is introduced, a cathode electrode into which an oxidant is introduced, and an electrolyte polymer membrane interposed between the anode and cathode electrodes, the electrotype polymer membrane including a hydrogen ion exchange membrane; wherein the cathode electrode includes:
a first catalyst layer arranged in contact with the electrolyte polymer membrane and adapted to effect a reduction reaction for the oxidant; and
a first gas diffusion layer adapted to diffuse the oxidant on the first catalyst layer, at least a part of the first gas diffusion layer directly contacting the electrolyte polymer membrane; and
a water-evaporation preventing member to prevent water evaporation, the first gas diffusion layer being disposed between the water-evaporation preventing member and the electrolyte polymer membrane, the water-evaporation preventing member directly contacting the first gas diffusion layer.

2. The fuel cell system according to claim 1, wherein the first gas diffusion layer has a larger area than the first catalyst layer.

3. The fuel cell system according to claim 2, wherein the anode electrode comprises a second catalyst layer arranged in contact with the electrolyte polymer membrane and adapted to effect an oxidation reaction for the hydrogen containing fuel, and a second gas diffusion layer adapted to diffuse the hydrogen containing fuel on the second catalyst layer.

4. The fuel cell system according to claim 3, wherein the second catalyst layer has the same area as the second gas diffusion layer.

5. The fuel cell system according to claim 3, wherein the first gas diffusion layer has a larger area than the second gas diffusion layer.

6. The fuel cell system according to claim 3, wherein the electric generator comprises gaskets respectively arranged with the anode and cathode electrodes.

7. The fuel cell system according to claim 6, wherein the gaskets are arranged with respective openings exposing surfaces of the first and second gas diffusion layers.

8. The fuel cell system according to claim 7, wherein the opening of a first gasket provided with the cathode electrode is larger than the opening of a second gasket provided with the anode electrode.

9. The fuel cell system according to claim 1, wherein the water-evaporation preventing member comprises a hydrophobic membrane.

10. The fuel cell system according to claim 9, wherein the hydrophobic membrane comprises a fluoric resin.

11. The fuel cell system according to claim 10, wherein the fluoric resin comprises at least one resin selected from among polytetrafluoro ethylene (PTFE), perfluorocarbon sulfonic acid, tetrafluoroethylene-perfluoroalkylvinyl ether copolymer (PFA), polytetrafluoroethylene-hexafluoropropylene copolymer (FEP), polychlorotrifluoroethylene (PCTFE), polyfluorovinyledene (PVDF), polyfluorovinyl (PVF), tetrafluoroethylene-ethylene copolymer (FTFE).

12. The fuel cell system according to claim 3, wherein the first gas diffusion layer of the cathode electrode is directly exposed to air.

13. The fuel cell system according to claim 12, further comprising a housing having an accommodating space adapted to accommodate the electric generator, the housing including a storage space adapted to store the hydrogen containing fuel to be supplied to the anode electrode, and a top plate having vents to directly expose the cathode electrode to air.

14. The fuel cell system according to claim 13, wherein the water-evaporation preventing member is arranged between the top plate of the housing and the first gas diffusion layer of the cathode electrode.

15. The fuel cell system according to claim 14, wherein the water-evaporation preventing member comprises a hydrophobic membrane.

16. The fuel cell system according to claim 15, wherein the hydrophobic membrane comprises a fluoric resin.

17. The fuel cell system according to claim 16, wherein the fluoric resin comprises at least one resin selected from among polytetrafluoro ethylene (PTFE), perfluorocarbon sulfonic acid, tetrafluoroethylene-perfluoroalkylvinyl ether copolymer (PFA), polytetrafluoroethylene-hexafluoropropylene copolymer (FEP), polychlorotrifluoroethylene (PCTFE), polyfluorovinyledene (PVDF), polyfluorovinyl (PVF), tetrafluoroethylene-ethylene copolymer (FTFE).

* * * * *